US012666395B2

(12) United States Patent  
Li et al.

(10) Patent No.: US 12,666,395 B2  
(45) Date of Patent: Jun. 23, 2026

(54) PAGING INDICATION METHOD, PAGING INDICATION APPARATUS, TERMINAL, AND READABLE STORAGE MEDIUM

(71) Applicant: VIVO MOBILE COMMUNICATION CO., LTD., Guangdong (CN)

(72) Inventors: Dongru Li, Guangdong (CN); Dajie Jiang, Guangdong (CN); Xiaodong Shen, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 378 days.

(21) Appl. No.: 18/315,646

(22) Filed: May 11, 2023

(65) Prior Publication Data

US 2023/0284183 A1 Sep. 7, 2023

Related U.S. Application Data

(63) Continuation of application No. PCT/CN2021/132844, filed on Nov. 24, 2021.

(30) Foreign Application Priority Data

Nov. 24, 2020 (CN) .......................... 202011331595.0

(51) Int. Cl.  
*H04W 68/02* (2009.01)  
*H04W 68/00* (2009.01)

(52) U.S. Cl.  
CPC ......... *H04W 68/02* (2013.01); *H04W 68/005* (2013.01)

(58) Field of Classification Search  
CPC .................................................... H04W 68/02  
See application file for complete search history.

(56) References Cited

U.S. PATENT DOCUMENTS 11,621,815 B1 * 4/2023 Xu ........................ H04L 5/0048  
370/329  
2016/0014718 A1 * 1/2016 Mysore Balasubramanya ...........  
H04W 52/0219  
455/458

(Continued)

FOREIGN PATENT DOCUMENTS

CN 110474708 A 11/2019  
EP 2453710 A1 5/2012

(Continued)

OTHER PUBLICATIONS

Qualcomm Incorporated, "TRS/CSI-RS for Idle/inactive UE power saving", 3GPP TSG-RAN WG1 #103-e, R1-2009267, Oct. 26-Nov. 13, 2020, e-Meeting.

(Continued)

*Primary Examiner* — William G Trost, IV  
(74) *Attorney, Agent, or Firm* — Perilla Knox & Hildebrandt LLP; Kenneth A. Knox

(57) ABSTRACT

Embodiments of this application provide a paging indication method, a paging indication apparatus, a terminal, and a readable storage medium. The paging indication method includes: obtaining paging early indication information; and determining first content based on the paging early indication information, where the first content includes at least one of the following: a monitoring behavior in N paging occasions subsequent to the paging early indication information, first configuration information related to the N paging occasions, and whether a first signal is available.

16 Claims, 4 Drawing Sheets

PEI indicates presence  
of paging for UE

| PEI | 2ms SSB | 2ms SSB | 2ms SSB | 4ms PO reception | 5ms SSB for interF |

20ms · 20ms · 20ms

(56) References Cited

U.S. PATENT DOCUMENTS

| | | | | |
|---|---|---|---|---|
| 2020/0059862 A1* | 2/2020 | Wong | .................... | H04W 76/27 |
| 2020/0107267 A1 | 4/2020 | Wu et al. | | |
| 2020/0280959 A1* | 9/2020 | Sharma | ............ | H04W 52/0219 |
| 2020/0404617 A1 | 12/2020 | Murray et al. | | |
| 2022/0070783 A1* | 3/2022 | Hsieh | ................ | H04W 52/0235 |
| 2023/0043139 A1 | 2/2023 | Hwang et al. | | |
| 2023/0156723 A1* | 5/2023 | Zhou | ..................... | H04L 5/0053 |
| | | | | 370/329 |
| 2023/0180180 A1* | 6/2023 | Dong | ................. | H04W 72/232 |
| | | | | 455/458 |

FOREIGN PATENT DOCUMENTS

| | | |
|---|---|---|
| EP | 3657864 A1 | 5/2020 |
| JP | 2020507980 A | 3/2020 |
| JP | 2023530690 A | 7/2023 |
| JP | 2023537659 A | 9/2023 |
| KR | 20200026921 A | 3/2020 |
| WO | 2019027242 A1 | 2/2019 |
| WO | 2019086674 A1 | 5/2019 |
| WO | 2020216242 A1 | 10/2020 |
| WO | 2022031135 A1 | 2/2022 |
| WO | WO-2022236620 A1 * | 11/2022 | ........ H04W 52/0235 |

OTHER PUBLICATIONS

Moderator (Mediatek), "Summary for Potential Paging Enhancements", 3GPP TSG RAN WG1 e-Meeting #103, R1-2009753, Oct. 26-Nov. 13, 2020, e-Meeting.

Moderator (Mediatek), "Summary#3 of Paging Enhancements", 3GPP TSG RAN WG1 #106-e, R1-2108475, Aug. 16-27, 2021, e-Meeting.

Vivo, "Paging enhancements for idle/inactive mode UE power saving", 3GPP TSG RAN WG1#103-e, R1-2007673, Oct. 26-Nov. 13, 2020, e-Meeting.

Huawei, Hisilicon, Paging enhancement(s) for UE power saving in IDLE/inactive mode, 3GPP TSG RAN WG1 Meeting #103-e, R1-2007600, E-meeting, Oct. 26-Nov. 13, 2020.

First Office Action for JP Patent Application No. 2025-054533 of Dec. 16, 2025.

Moderator (Samsung), "Moderator summary for TRS/CSI-RS occasion(s) for idle/inactive UEs," 3GPP TSG RAN WG1 #103-e e-Meeting, Doc. R1-2008178, Oct. 26-Nov. 13, 2020.

First Office Action for KR Patent Application No. 10-2023-7019787 of Jan. 9, 2026.

* cited by examiner

PAGING INDICATION METHOD, PAGING INDICATION APPARATUS, TERMINAL, AND READABLE STORAGE MEDIUM

CROSS-REFERENCE TO RELATED APPLICATIONS

This application is a continuation application of International Application No. PCT/CN2021/132844 filed on Nov. 24, 2021, which claims priority to Chinese Patent Application No. 202011331595.0, filed with the China National Intellectual Property Administration on Nov. 24, 2020, which are incorporated herein by reference in their entireties.

TECHNICAL FIELD

This application relates to the field of communications technologies, and in particular, to a paging indication method and apparatus, a terminal, and a readable storage medium.

BACKGROUND

In a mobile communications system, user equipment (UE), alternatively referred to as a terminal, periodically monitors paging messages to establish a service connection. In each paging cycle, the terminal may obtain, through calculation, a resource location corresponding to a paging occasion for the terminal, and then detects whether a paging physical downlink control channel (PDCCH) scrambled by a paging radio network temporary identity (P-RNTI) is present in the paging occasion (PO). If the paging PDCCH is detected, a scheduled corresponding physical downlink shared channel (PDSCH) is decoded to obtain a paging message therein.

In the related art, whether paging monitoring is required for an associated PO can be determined based on a paging early indication received from a network side, so as to reduce power consumption resulted from measurements, paging PDCCH demodulation, and the like. However, transmission of a paging early indication requires a large amount of network overheads and cause problems such as lower reliability of paging PDCCH/PDSCH detection and demodulation.

SUMMARY

Embodiments of this application provide a paging indication method, a paging indication apparatus, a terminal, and a readable storage medium.

According to a first aspect, an embodiment of this application provides a paging indication method, including:

obtaining paging early indication information, where the paging early indication information is used to indicate first content; and determining the first content based on the paging early indication information; where the first content includes at least one of the following: a monitoring behavior in N paging occasions subsequent to the paging early indication information, first configuration information related to the N paging occasions, and whether a first signal is available; where N is a positive integer greater than or equal to 1.

According to a second aspect, an embodiment of this application provides a paging indication apparatus, including:

an obtaining module, configured to obtain paging early indication information; and a determining module, configured to determine first content based on the paging early indication information; where the first content includes at least one of the following: a monitoring behavior in N paging occasions subsequent to the paging early indication information, first configuration information related to the N paging occasions, and whether a first signal is available; where N is a positive integer greater than or equal to 1.

According to a third aspect, an embodiment of this application provides a terminal, including a processor, a memory, and a program or instructions stored in the memory and running on the processor. In a case that the program or the instructions are executed by the processor, the steps of the paging indication method according to the first aspect are implemented.

According to a fourth aspect, an embodiment of this application provides a readable storage medium. The readable storage medium stores a program or instructions, and in a case that the program or the instructions are executed by a processor, the steps of the paging indication method according to the first aspect are implemented.

According to a fifth aspect, an embodiment of this application provides a chip. The chip includes a processor and a communications interface, where the communications interface is coupled to the processor, and the processor is configured to run a program or instructions to implement the steps of the paging indication method according to the first aspect.

In the embodiments of this application, the terminal obtains paging early indication (PEI) information, where the paging early indication information is used to indicate first content; and determines the first content based on the paging early indication information; where the first content includes at least one of the following: a monitoring behavior in N paging occasions subsequent to the paging early indication information, first configuration information related to the N paging occasions, and whether a first signal is available; where N is a positive integer greater than or equal to 1.

BRIEF DESCRIPTION OF DRAWINGS

The above and/or additional aspects and advantages of this application will become obviously easy to understand from the description of the embodiments with reference to the following drawings.

DESCRIPTION OF EMBODIMENTS

To more clearly understand the foregoing purposes, features, and advantages in this application, the following further describes in detail this application with reference to the accompanying drawings and specific embodiments. It should be noted that, in absence of conflict, the embodiments and features in the embodiments of this application may be combined with each other.

The following describes many specific details to help fully understand this application. However, this application can also be implemented in other ways different from those described herein. Therefore, the protection scope of this application is not limited by the specific embodiments disclosed below.

With reference to FIG. 1 to FIG. 8, the following describes a paging indication method, a paging indication apparatus, a terminal, and a readable storage medium according to some embodiments of this application.

Figures 1, 2:
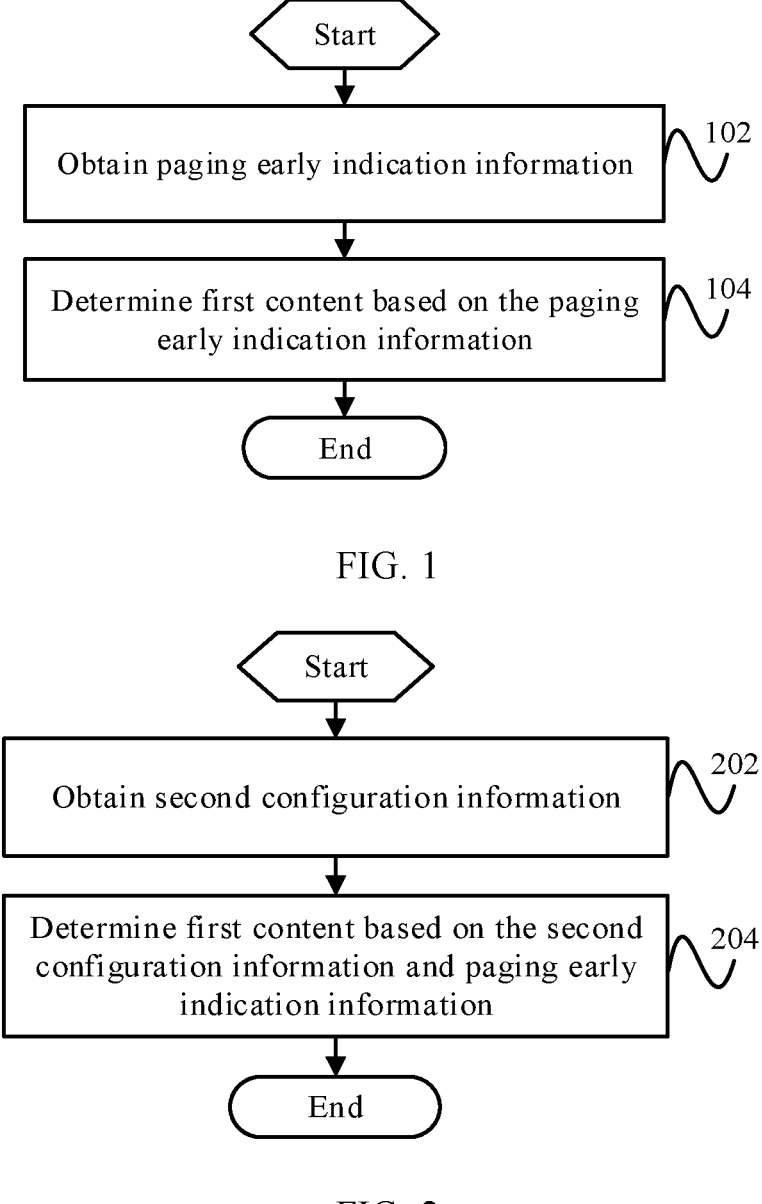
FIG. 1 is a first flowchart of a paging indication method according to an embodiment of this application.
FIG. 2 is a second flowchart of a paging indication method according to an embodiment of this application.

In an embodiment of this application, FIG. 1 is a first flowchart of a paging indication method according to an embodiment of this application. The paging indication method includes the following steps.

Step 102. Obtain paging early indication information.

Step 104. Determine first content based on the paging early indication information.

The first content includes at least one of the following: a monitoring behavior in N paging occasions subsequent to the paging early indication information, first configuration information related to the N paging occasions, and whether a first signal is available. N is a positive integer that is greater than or equal to 1 and is less than or equal to the maximum number of paging occasions configured in a PF.

In this embodiment, a terminal determines the monitoring behavior in the N paging occasions based on the paging early indication information transmitted by a network side. In this case, it is unnecessary to transmit one piece of paging early indication information before each paging occasion to indicate whether monitoring is required, thereby reducing network overheads for transmitting the paging early indication information. In addition, the paging early indication information can also be used for determining first configuration information related to the N paging occasions and/or whether a first signal is available. This ensures the reliability of demodulation and monitoring of paging physical downlink control channels (paging PDCCH) and paging physical downlink shared channels (paging PDSCH), thereby reducing energy consumption and performance overheads of the terminal.

It should be noted that a paging occasion (PO) is a set of monitoring occasions (a plurality of MOs) for paging PDCCH and may include a plurality of slots. For each terminal (UE), only one paging occasion associated with the terminal needs to be detected in one paging cycle (DRX cycle). The network configures that UEs in an idle state are evenly assigned a plurality of POs based on terminal identification information. The UE may obtain a PO for the UE according to protocol prescription. The first signal is a TRS/CSI-RS reference signal, where configuration information of the TRS/CSI-RS reference signal may be configured by using a system message.

Further, the N paging occasions may be N continuous paging occasions or N discontinuous paging occasions.

In the foregoing embodiment, the paging early indication information is used to notify the UE whether a subsequent PO needs to be monitored. This can save power consumption required for receiving, before PO monitoring, one or more SSBs based on channel quality for synchronous measurement, thereby implementing power saving for the terminal. In addition, one piece of paging early indication information provided in this embodiment is used to indicate subsequent one or more paging occasions, reducing network overheads. As a result, both network overheads and power saving for the terminal are balanced.

In an embodiment of this application, further, each of the N paging occasions is associated with W paging groups, where W is a positive integer greater than or equal to 1.

In this embodiment, different UEs may be assigned one PO, that is, a plurality of UEs are associated with one PO. In order to further reduce a probability of false wakeup of a plurality of UEs in the same PO, UEs associated with each of the N POs can be further divided into W paging groups. That is, N×W paging groups are divided for the N POs, where W is the number of paging groups obtained by grouping the UEs associated with one PO.

It should be noted that when W is 1, the UEs associated with the PO are in only one paging group, that is, no grouping is performed for the PO.

In this embodiment, grouping is performed for the PO, reducing a probability of false wakeup of the terminal and further reducing energy consumption of the terminal.

In an embodiment of this application, further, the monitoring behavior includes at least one of the following: whether to monitor a paging physical downlink control channel PDCCH of a paging group associated with the terminal, whether to monitor paging of the paging group associated with the terminal, and whether to monitor a system information update of the paging group associated with the terminal.

The paging group associated with the terminal is at least one of paging groups that are associated with at least one of the N paging occasions.

It should be noted that a paging occasion associated with the terminal is one (or more) of the N paging occasions. In a case that W paging groups are present on the paging occasion associated with the terminal, the terminal is further assigned one (or more) of the W groups. That is, the number of paging groups associated with the terminal may be one or more.

In this embodiment, if the paging early indication information obtained by the terminal indicates that the terminal needs to monitor the paging physical downlink control channel (paging PDCCH), the terminal performs blind detection on a physical downlink control channel PDCCH scrambled by a paging radio network temporary identity (P-RNTI). In a case that the terminal detects the paging PDCCH, the terminal further receives and decodes a scheduled physical downlink shared channel (PDSCH) based on downlink control information (DCI) in the PDCCH. In a case that the terminal detects no paging PDCCH, it is considered that there is no paging message for the terminal, and then the terminal enters a corresponding sleep state based on a paging cycle. If the paging early indication information received by the terminal indicates that the paging physical downlink control channel does not need to be monitored, subsequent paging PDCCHs are not monitored and the terminal enters a corresponding sleep state based on the paging cycle. Likewise, if the paging early indication information received by the terminal indicates that paging and/or a system information update needs to be monitored, the terminal receives corresponding paging and/or ETWS, CMAS, or the like.

It should be noted that when W=1, that is, no grouping is performed for a PO, the monitoring behavior does not need to be specific to a paging group. That is, the monitoring behavior includes at least one of the following: whether to monitor a paging physical downlink control channel in a paging occasion associated with the terminal, whether to monitor paging in the paging occasion associated with the terminal, and whether to monitor a system information update in the paging occasion associated with the terminal.

In an embodiment of this application, further, the first configuration information includes at least one of the following: a minimum time interval between the paging early indication information and a first paging occasion of the N paging occasions, a value of N, and indexes of the N paging occasions.

In this embodiment, indexes of all paging occasions in each paging cycle can be configured by the network, and the paging early indication information dynamically indicates the indexes of the indicated N paging occasions, so as to determine the indicated N paging occasions. The first paging occasion may be one of the N paging occasions.

In some embodiments, the first paging occasion may be a paging occasion of the N paging occasions closest to the paging early indication information associated. That is, the first paging occasion may be the earliest (or the first) paging occasion of the N paging occasions. In addition, the first paging occasion may alternatively be the latest paging occasion, which is not limited herein.

In addition, in an embodiment, the value of N is related to the number of paging occasions configured in a paging frame PF. The first configuration information is used to determine an indication relationship between the paging early indication information and the subsequent N paging occasions, and the minimum time interval between the first paging occasion of the N paging occasions and the paging early indication information is satisfied. In this way, the N paging occasions can be indicated dynamically and flexibly, reducing network overheads for transmitting the paging early indication information. In addition, a sufficient time interval is reserved between the paging early indication information and the indicated N paging occasions, so that measurement can be performed on related reference signals. This ensures reliability of demodulation and monitoring of paging physical downlink control channels and paging physical downlink shared channels, and reduces energy consumption and performance overheads of the terminal.

Specifically, for example, the terminal has received paging early indication information. The paging early indication information is associated with and indicates subsequent N paging occasions PO, and includes at least one of the following.

1. Non-public information, namely, information that needs to be separately configured for different POs, where the non-public information includes monitoring behaviors in the N POs subsequent to the paging early indication information.

The monitoring behavior includes: whether to monitor a paging PDCCH in a PO associated with the terminal, where the paging PDCCH contains the following paging and a system message update indication; whether to monitor the paging in the PO associated with the terminal; and whether to monitor a system message update in the PO associated with the terminal.

In some embodiments, the PO associated with the terminal is at least one of the N POs. In a case that the paging early indication information further indicates a paging group for a paging occasion, for at least one paging group of at least one PO, associated with the terminal, in the N POs, The monitoring behavior includes: whether to monitor a paging PDCCH of a paging group associated with the terminal, whether to monitor paging of the paging group associated with the terminal, and whether to monitor a system information update of the paging group associated with the terminal.

2. Public information, namely, information that can be uniformly configured for the N POs, where the public information includes the following.

(1) Whether a TRS/CSI-RS is available, where configuration information of the TRS/CSI-RS can be configured by using a system message.

(2) Value of N, where in a case that one PF includes four POs, the value of N may be 4.

(3) The number W of paging groups divided for one PO, where for example, W=4.

Figure 4:
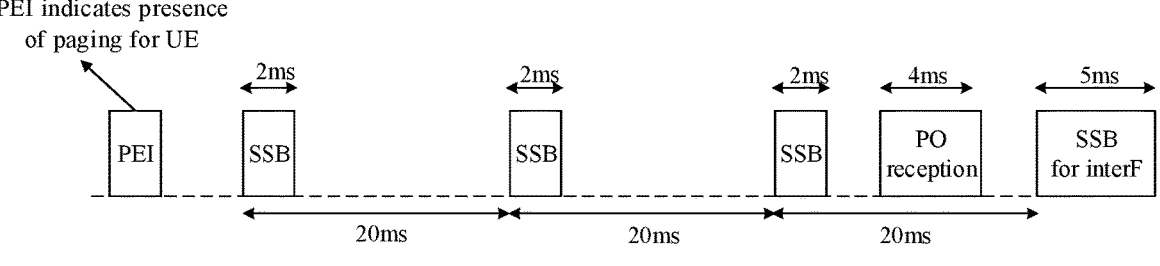
FIG. 4 is a schematic diagram of a principle of paging indication according to a specific embodiment of this application.

(4) As shown in FIG. 4, a minimum time interval between the paging early indication information and the subsequent associated N POs may be three SSB periods, where one SSB period is 20s, and then the minimum time interval needs to be at least greater than or equal to 60 ms. In addition, the minimum time interval may alternatively be 60 ms, 80 ms, or 120 ms.

(5) Indexes of the N POs, where the indicated N POs are determined based on the indexes of the N POs indicated by the paging early indication information.

In an embodiment of this application, FIG. 2 is a second flowchart of a paging indication method according to an embodiment of this application. The paging indication method further includes the following steps.

Step 202. Obtain second configuration information.

The second configuration information is configured by a network side and/or specified by a protocol.

Further, the second configuration information includes at least one of the following: a minimum time interval between paging early indication information and a second paging occasion of N paging occasions, a time-domain position of the paging early indication information, a frequency-domain position of the paging early indication information, a value of N, a candidate value of N, a value of the number W of paging groups associated with the paging occasion, and an indication relationship between the paging early indication information and the N paging occasions.

In some embodiments, similar to the first paging occasion, the second paging occasion may be one of the N paging occasions. In some embodiments, the second paging occasion may be a paging occasion of the N paging occasions closest to the paging early indication information associated. That is, the second paging occasion may be the earliest (or the first) paging occasion of the N paging occasions. In addition, the second paging occasion may alternatively be the latest paging occasion, which is not limited herein.

Different UEs may be assigned one PO, that is, a plurality of UEs are associated with one PO. In order to further reduce a probability of false wakeup of a plurality of UEs in the same PO, UEs associated with each of the N POs can be further divided into W paging groups. That is, N×W paging groups are divided for the N POs, where W is the number of paging groups obtained by grouping the UEs associated with one PO.

Step 204. Determine first content based on the second configuration information and paging early indication information.

It should be understood that the second configuration information may be obtained from network-side configuration and/or protocol prescription before the paging early indication information is obtained.

In an embodiment of this application, specifically, the network side configures: (1) a minimum time interval between the paging early indication information and the second paging occasion of the N paging occasions; (2) the time-domain position of the paging early indication information; (3) the frequency-domain position of the paging early indication information; (4) the value of N (N is the number of POs indicated by one piece of paging early indication information); and (5) a value of W (the number of paging groups in a PO).

In an embodiment, the network side may broadcast the foregoing (1) to (5) of the second configuration information to the terminal by using system information 1 (SIB1), a master information block (MIB), a PBCH, or the like. In addition, the indication relationship between the paging early indication information and the N paging occasions may be specified by a protocol.

In this embodiment, the terminal receives the second configuration information and the paging early indication information, and determines the monitoring behavior in the N paging occasions, the first configuration information related to the N paging occasions, and/or whether the first signal is available accordingly. In this case, it is unnecessary to transmit paging early indication information before each paging occasion for indication. This reduces the network overheads for transmitting the paging early indication information, and ensures the reliability of demodulation and monitoring of paging physical downlink control channels and paging physical downlink shared channels.

It should be understood that a terminal can obtain the first configuration information from the paging early indication information or obtain the first configuration information from the second configuration information. Part of content in the first configuration information and the second configuration information is the same, for example, the minimum time interval between the paging early indication information and the N paging occasions and the value of N. In a case that a configuration obtained by the terminal from the second configuration information is inconsistent with content of a same configuration obtained from the paging early indication information, the configuration indicated by the paging early indication information prevails, which is equivalent to an update of the inconsistent configuration based on the paging early indication information. For example, the second configuration information indicates that the minimum time interval is 60 ms, while the paging early indication information indicates that the minimum time interval is 80 ms. In this case, the terminal performs a monitoring operation in a subsequent paging occasion with the minimum time interval of 80 ms.

The candidate value of N means that a plurality of candidate values may be configured for N by the network side. For example, N=1, 2, 4, or 8. Then, the value of N is further determined based on the received paging early indication information. For example, the paging early indication information indicates that the value of N is 4.

In an embodiment of this application, further, the minimum time interval needs to satisfy at least one of the following conditions.

(1) The minimum time interval needs to be at least greater than or equal to a transmission period of K synchronization signal blocks, where K is a positive integer greater than or equal to 0. It can be understood that a transmission period of synchronization signal blocks is also a reception period of the synchronization signal blocks. For example, there are two transmission periods between three synchronization signal blocks (SSB), and a transmission period configured by the network side is 20 ms. In this case, the minimum time interval needs to be at least greater than 40 ms.

(2) The minimum time interval is related to at least one of channel quality of a serving cell, signal strength, coverage performance, terminal location, and terminal moving rate.

Specifically, for example, the minimum time interval is associated with the channel quality of a serving cell, a plurality of minimum time intervals are configured by the network device, and the terminal side selects a corresponding minimum time interval based on the measured channel quality. For example, in a case that a signal-to-noise ratio (SNR) is −6 dB, the channel quality is poor and a corresponding minimum time interval is greater than or equal to a transmission period of three SSBs; and in a case that the SNR is 0 dB, the channel quality is relatively good and a corresponding minimum time interval is greater than or equal to a transmission period of one SSB.

In addition, in another embodiment, the minimum time interval needs to be greater than or equal to a processing delay of the paging early indication information, and the processing delay refers to a time interval required by the terminal from receiving the paging early indication information to completing demodulation or detection.

In an embodiment of this application, further, the time-domain position of the paging early indication information needs to satisfy at least one of the following:

(1) the time-domain position of the paging early indication information is prior to the N paging occasions and satisfies the minimum time interval;

(2) a start time point of the time-domain position of the paging early indication information is a time-domain end time point of a synchronization signal block; and (3) an end time point of the time-domain position of the paging early indication information is a time-domain start time point of a synchronization signal block.

In an embodiment of this application, further, an indication relationship between the paging early indication information and the paging occasions includes any one of the following:

(1) different paging early indication information indicates a same paging occasion; and (2) a same paging occasion is able to be indicated only by same paging early indication information.

First content indicated by the same paging early indication information is the same.

For example, according to (1), PEI 1 indicates PO1 and PO2, and PEI 2 indicates PO2 and PO3. PEI 1 and PEI 2 may indicate a same PO, namely, PO2. For another example, both PEI 1 and PEI 2 indicate PO1 and PO2. In this case, it may be considered that the paging early indication information is transmitted repeatedly by using PEI 1 and PEI 2. However, PEI 1 and PEI 2 are different at least in one of the time-domain position, the frequency-domain position, and an associated SSB index.

For another example, according to (2), one PO may be indicated by one PEI, that is, PO1 may be indicated only by PEI 1. In this case, PO1 cannot be indicated by a PEI other than PEI 1. For another example, one PO may be indicated by PEI 1 and PEI 2, and PEI 1 and PEI 2 indicate the same first content. In this case, PEI 1 and PEI 2 can be regarded as a duplicate of each other.

In an embodiment of this application, further, the paging early indication information is carried by downlink control information (DCI) or a sequence.

In this embodiment, the paging advance indication information may be physical layer control information, or may be a reference signal or a sequence. The terminal can obtain the paging early indication information by monitoring downlink control information (DCI) of a physical downlink control channel sent by the network device or by monitoring a sequence sent by the network device.

In an embodiment of this application, further, in a case that the paging early indication information is carried by the downlink control information (DCI), an indication manner of the first content includes at least one of the following: a bitmap or a bit string.

In some embodiments, in a case that the first content is indicated using a bit string. The bit string includes target bits, and the target bits include at least a plurality of code points, and the code points are used to indicate whether UE associated with a paging group needs to monitor a corresponding PDCCH. Therefore, the terminal can determine, based on the code points in the target bits, whether the paging group associated with the paging occasion indicated by the paging early indication information needs to monitor a corresponding PDCCH. Different code points correspond to different paging groups or correspond to different terminals in one paging group. In this way, the target bits are used to indicate a monitoring task, reducing the number of bits required by the paging early indication information and helping reduce performance loss.

Specifically, for example, the paging early indication information indicates that UEs associated with a PO are divided into four paging groups, and target bits are used to indicate whether the four paging groups need to monitor a paging PDCCH. Details are shown in Table 1.

TABLE 1

| Code point | Event |
| --- | --- |
| '001' | Only group 1 needs to monitor paging. |
| '010' | Only group 2 needs to monitor paging. |
| '011' | Only group 3 needs to monitor paging. |
| '100' | Only group 4 needs to monitor paging. |
| '111' | At least two groups need to monitor paging. |
| '000' | No groups need to monitor paging. |

It should be noted that the groups or terminals represented by different code points can be properly set by using the paging configuration information of the network device.

For example, in manner 1, for two or more paging groups, code point 1 to code point N×W each indicate that terminals in one of the N×W paging groups need to monitor a corresponding PDCCH. Code point N×W+1 indicates that the terminals in all N×W paging groups need to monitor corresponding PDCCHs, or indicates that the terminals in all N POs need to monitor corresponding PDCCHs.

In manner 2, for three or more paging groups, code point 1 to code point N×W each indicate that terminals in one of the N×W paging groups need to monitor a corresponding PDCCH; code point N×W+1 to N×W+X each indicate that terminals in any two of the N×W paging groups need to monitor corresponding PDCCHs, where X is the number of different combinations of any two of the N×W paging groups; and code point N×W+X+1 indicates that terminals in all N×W paging groups need to monitor corresponding PDCCHs or terminals in all N POs need to monitor corresponding PDCCHs.

In an embodiment of this application, further, in a case that the paging early indication information is carried by downlink control information (DCI), indication fields for indicating the first content in the paging early indication information are arranged in a preset arrangement order. The preset arrangement order includes at least one of the following: being arranged based on paging occasions associated with the paging early indication information, being arranged based on content type of the first content, and being arranged in ascending or descending order of values of N.

In an embodiment of this application, downlink control information (DCI) of a PDCCH is divided into N+1 information blocks, where the N information blocks correspond to monitoring behaviors in N paging occasions respectively. The 1st or the (N+1)th information block carries the first configuration information related to the N paging occasions and whether the first signal is available.

In another embodiment, arrangement is performed based on content type of the first content. That is, whether to monitor a paging PDCCH in N POs is added first, followed by whether to monitor paging in N POs and then whether to monitor an system information update in N POs, and so on.

Arrangement is performed in ascending or descending order of the value of N. That is, first content indicating the $1^{st}$ PO is added first, followed by first content indicating the $2^{nd}$ PO and so on.

Specifically, for example, as specified by a protocol, the time-domain position of the paging early indication information needs to satisfy the minimum time interval and satisfy that a time domain end location of the paging early indication information is a time domain start location of the SSB. The paging early indication information indicates subsequent continuous N POs. In addition, it is satisfied that one PO can be indicated only by one piece of paging early indication information. Candidate time intervals are configured and numbered by the higher layer, and an index of a selected time interval is carried in the paging early indication information.

Figure 5:
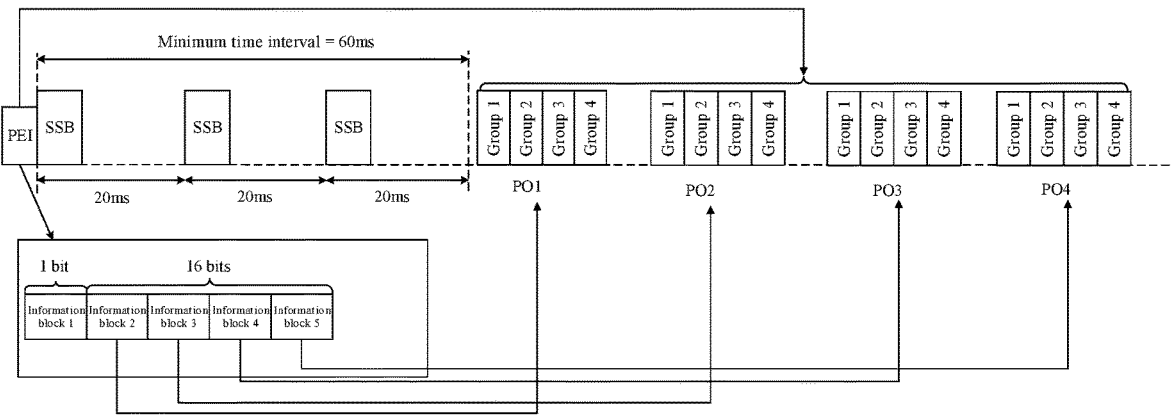
FIG. 5 is a schematic diagram of a configuration principle for paging early indication information according to a specific embodiment of this application.

As shown in FIG. 5, the network device carries the following paging configuration information in SIB 1: terminals in one PO are divided into four paging groups, which are denoted by PO1, PO2, PO3, and PO4; and candidate values of N are 2, 4, and 8.

As shown in FIG. 5, one-way arrow represents that the paging early indication information indicates whether to monitor paging PDCCHs of the N×W paging groups, where W represents the number of paging groups obtained by grouping UEs in one PO. That is, the N POs have a total of N×W subgroups. Whether the TRX/CSI-RS is available. After obtaining the paging early indication information, the terminal determines that a minimum time interval between the paging early indication information and the subsequent N POs associated is three SSB periods, where one SSB period is 20s. The indicated time interval is 60 ms. The value of N is 4.

Manners of the paging configuration information include manner 1 and manner 2. In manner 1, where a mapping is established between the paging configuration information and a bit string. As shown in FIG. 5, the paging configuration information is arranged in groups based on PO. DCI of a PDCCH is divided into N+1=5 information blocks, where four information blocks carry non-public information of four POs respectively. The $1^{st}$ information block carries public information. Information block 1: one bit is used to indicate whether the TRS/CSI-RS is available, '0' indicates being unavailable and '1' indicates being available. Information block 2 corresponds to PO1: a bit string (bitstring) is used for mapping, where three bits are used to indicate whether a paging PDCCH needs to be monitored in four groups of PO1. Information blocks 3, 4, and 5 correspond to PO2, PO3, and PO4 respectively. A bitstring is used for mapping, where three bits are used separately to indicate whether a paging PDCCH needs to be monitored in four groups of PO2, PO3, and PO4. Details are the same as the indication method for information block 2. Therefore, a total of 13 bits are required for indication.

In manner 2, a bitmap is used for mapping with the paging configuration information. The paging configuration information is arranged in groups based on PO. DCI of a PDCCH is divided into N+1=5 information blocks, where four information blocks carry non-public information of four POs respectively. The $1^{st}$ information block carries public information. Information block 1: one bit is used to indicate whether the TRS/CSI-RS is available, '0' indicates being unavailable and '1' indicates being available. Two bits are used to indicate an index of the minimum time interval, and two bits are used to indicate the value number of N. Information blocks 2, 3, 4, and 5 correspond to PO1, PO2, PO3, and PO4 respectively. A bitstring is used for mapping, where four bits are used separately to indicate whether the paging PDCCH needs to be monitored in four groups of PO1, PO2, PO3, and PO4. '0' indicates monitoring, and '1' indicates no monitoring. Therefore, a total of 5+4×4=21 bits are required for indication.

Figure 3:
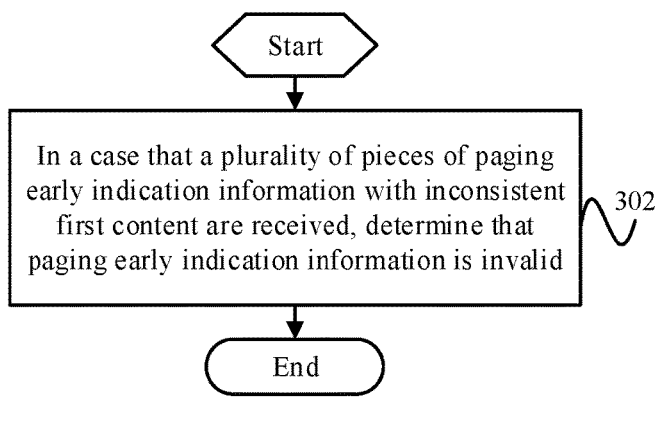
FIG. 3 is a third flowchart of a paging indication method according to an embodiment of this application.

In an embodiment of this application, FIG. 3 is a third flowchart of a paging indication method according to an embodiment of this application. The paging indication method includes the following steps.

Step 302. In a case that a plurality of pieces of paging early indication information with inconsistent first content are received, determine that the paging early indication information is invalid.

The plurality of pieces of paging early indication information with inconsistent first content indicate the same N paging occasions.

In this embodiment, the terminal does not expect to receive a plurality of pieces of paging early indication information with inconsistent first content, where the plurality of pieces of paging early indication information with inconsistent first content indicate the same N paging occasions. In a case that the plurality of pieces of paging early indication information with inconsistent first content are received, it is determined that the paging early indication information is invalid. In this case, the monitoring behavior of the terminal may be performing monitoring or skipping monitoring, or a specific monitoring behavior of the terminal is determined by the network side or according to protocol prescription.

For example, PEI 1 and PEI 2 jointly indicate PO1. In this case, the UE does not expect that PEI 1 and PEI 2 indicate different content, for which an error case is defined.

Specifically, for example, a plurality of PEIs (PEI 1 and PEI 2) indicate the same N POs. That is, content of downlink control information (DCI) for a plurality of MOs in the same DRX cycle indicated by the PEIs needs to be consistent.

Figure 6:
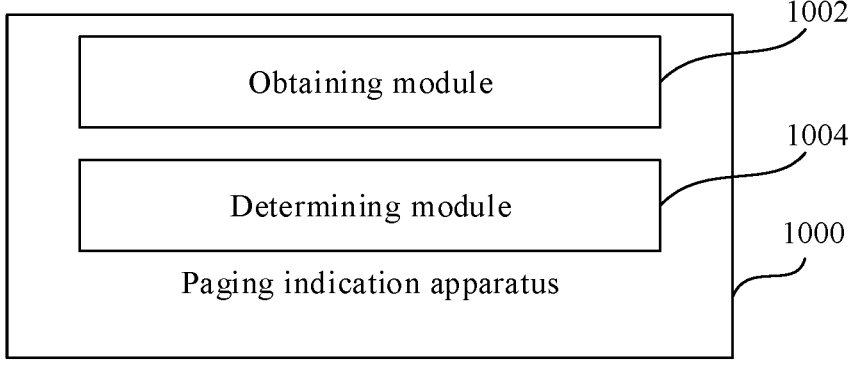
FIG. 6 is a structural block diagram of a paging indication apparatus according to an embodiment of this application.

In an embodiment of this application, FIG. 6 is a structural block diagram of a paging indication apparatus according to an embodiment of this application. A paging indication apparatus 1000 includes: an obtaining module 1002, where the obtaining module 1002 is configured to obtain paging early indication information; and a determining module 1004, where the determining module 1004 is configured to determine first content based on the paging early indication information. The first content includes at least one of the following: a monitoring behavior in N paging occasions subsequent to the paging early indication information, first configuration information related to the N paging occasions, and whether a first signal is available. N is a positive integer that is greater than or equal to 1 and is less than or equal to the maximum number of paging occasions configured in a PF.

In this embodiment, a terminal determines the monitoring behavior in the N paging occasions based on the paging early indication information transmitted by a network side. In this case, it is unnecessary to transmit one piece of paging early indication information before each paging occasion to indicate whether monitoring is required, thereby reducing network overheads for transmitting the paging early indication information. In addition, the paging early indication information can also be used for determining first configuration information related to the N paging occasions and/or whether a first signal is available. This ensures reliability of demodulation and monitoring of paging physical downlink control channels and paging physical downlink shared channels, and reduces energy consumption and performance overheads of the terminal.

In some embodiments, each of the N paging occasions is associated with W paging groups, where W is a positive integer greater than or equal to 1.

In some embodiments, the monitoring behavior includes at least one of the following: whether to monitor a paging physical downlink control channel PDCCH of a paging group associated with the terminal, whether to monitor paging of the paging group associated with the terminal, and whether to monitor a system information update of the paging group associated with the terminal, where the paging group associated with the terminal is at least one of paging groups that are associated with at least one of the N paging occasions.

In some embodiments, the first configuration information includes at least one of the following: a minimum time interval between the paging early indication information and a first paging occasion of the N paging occasions, a value of N, and indexes of the N paging occasions.

In some embodiments, the obtaining module 1002 is further configured to obtain second configuration information; and the determining module 1004 is further configured to determine the first content based on the second configuration information and the paging early indication information. The second configuration information includes at least one of the following: the minimum time interval between the paging early indication information and a second paging occasion of the N paging occasions, a time-domain position of the paging early indication information, a frequency-domain position of the paging early indication information, the value of N, a candidate value of N, a value of the number W of paging groups associated with the paging occasion, and an indication relationship between the paging early indication information and the paging occasion.

In some embodiments, the minimum time interval satisfies at least one of the following: the minimum time interval is greater than or equal to a transmission period of K synchronization signal blocks, where K is a positive integer greater than or equal to 0; and the minimum time interval is related to at least one of channel quality of a serving cell, signal strength, coverage performance, terminal location, and terminal moving rate.

In some embodiments, the time-domain position of the paging early indication information satisfies at least one of the following: the time-domain position of the paging early indication information is prior to the N paging occasions and satisfies the minimum time interval; an end time point of the time-domain position of the paging early indication information is a time-domain start time point of a synchronization signal block; and an end time point of the time-domain position of the paging early indication information is a time-domain start time point of a synchronization signal block.

In some embodiments, the indication relationship includes any one of the following: different paging early indication information indicates a same paging occasion, or a same paging occasion is able to be indicated only by same paging early indication information; where, the first content indicated by the same paging early indication information is the same.

In some embodiments, the determining module 1004 is further configured to: in a case that a plurality of pieces of paging early indication information with inconsistent first content are received, determine that the paging early indication information is invalid; where the plurality of pieces of paging early indication information with inconsistent first content indicate the same N paging occasions.

In some embodiments, the paging early indication information is carried by downlink control information DCI or a sequence.

In some embodiments, in a case that the paging early indication information is carried by the downlink control information DCI, an indication manner of the first content includes at least one of the following: a bitmap or a bit string.

In some embodiments, in a case that the paging early indication information is carried by downlink control information DCI, indication fields for indicating the first content in the paging early indication information are arranged in a preset arrangement order, where the preset arrangement order includes at least one of the following: being arranged based on paging occasions associated with the paging early indication information, being arranged based on content type of the first content, and being arranged in ascending or descending order of values of N.

In this embodiment, modules of the paging indication apparatus 1000 execute their respective functions to implement the steps of the paging indication method according to any one of the foregoing embodiments. Therefore, the paging indication apparatus also has all beneficial effects of the paging indication method in any one of the foregoing embodiments, which are not described herein again.

In some embodiments, the paging indication apparatus in this embodiment of this application may be a device, or may be a component, an integrated circuit, or a chip of a terminal. The device may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, or a personal digital assistant (PDA), or the like, and the non-mobile electronic device may be a server, a network attached storage (NAS), a personal computer PC), a television (TV), a teller machine, a self-service machine, or the like. This is not specifically limited in the embodiments of this application.

Figure 7:
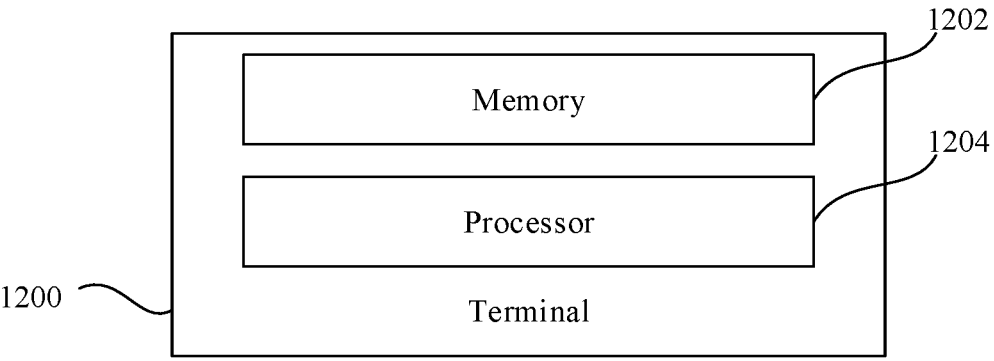
FIG. 7 is a structural block diagram of a terminal according to an embodiment of this application.

In an embodiment of this application, as shown in FIG. 7, a terminal 1200 is provided, including: a processor 1204, a memory 1202, and a program or instructions stored in the memory 1202 and capable of running on the processor 1204. In a case that the program or the instructions are executed by the processor 1204, the steps of the paging indication method in any one of the foregoing embodiments are implemented. Therefore, the terminal 1200 has all beneficial effects of the paging indication method in any one of the foregoing embodiments, which is not described herein again.

A terminal in the embodiments of this application may be an apparatus with an operating system. The operating system may be an Android operating system, an iOS operating system, or another possible operating system. This is not specifically limited in the embodiments of this application.

Figure 8:
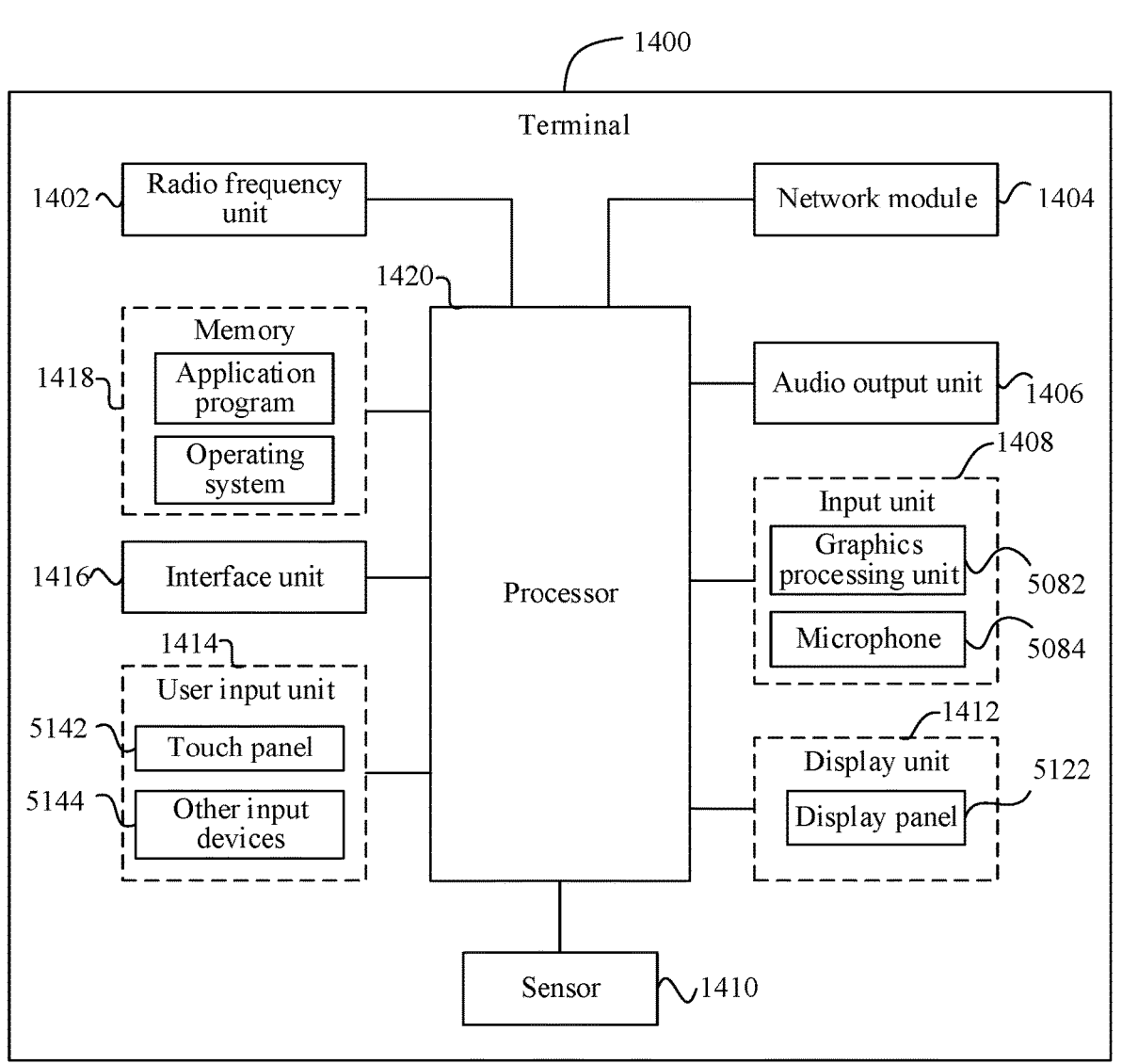
FIG. 8 is a block diagram of a hardware structure of a terminal according to an embodiment of this application.

FIG. 8 is a schematic diagram of a hardware structure of a terminal 1400 implementing an embodiment of this application.

The terminal 1400 includes but is not limited to components such as a radio frequency unit 1402, a network module 1404, an audio output unit 1406, an input unit 1408, a sensor 1410, a display unit 1412, a user input unit 1414, an interface unit 1416, a memory 1418, and a processor 1420.

A person skilled in the art can understand that the terminal 1400 may further include a power source (such as a battery) for supplying power to the components. The power source may be logically connected to the processor 1420 through a power management system. In this way, functions such as charge management, discharge management, and power consumption management are implemented by using the power management system. The structure of the terminal shown in FIG. 8 does not constitute any limitation on the terminal. The terminal may include more or fewer components than shown in the figure, or a combination of some components, or components disposed differently. In the embodiment of this application, the terminal includes but is not limited to a mobile terminal, a tablet computer, a notebook computer, a palmtop computer, an in-vehicle electronic device, a wearable device, a pedometer, and the like.

The processor 1420 is configured to obtain paging early indication information, and determine first content based on the paging early indication information. The first content includes at least one of the following: a monitoring behavior in N paging occasions subsequent to the paging early indication information, first configuration information related to the N paging occasions, and whether a first signal is available. N is a positive integer that is greater than or equal to 1 and is less than or equal to the maximum number of paging occasions configured in a PF.

In this embodiment, the terminal determines the monitoring behavior in the N paging occasions based on the paging early indication information transmitted or broadcast by a network side. In this case, it is unnecessary to transmit one piece of paging early indication information before each paging occasion to indicate whether monitoring is required, thereby reducing network overheads for transmitting the paging early indication information. In addition, the paging early indication information can also be used for determining first configuration information related to the N paging occasions and/or whether a first signal is available. This ensures the reliability of demodulation and monitoring of paging physical downlink control channels (paging PDCCH) and paging physical downlink shared channels (paging PDSCH).

Further, each of the N paging occasions is associated with W paging groups, where W is a positive integer greater than or equal to 1.

Further, the monitoring behavior includes at least one of the following: whether to monitor a paging physical downlink control channel PDCCH of a paging group associated with the terminal, whether to monitor paging of the paging group associated with the terminal, and whether to monitor a system information update of the paging group associated with the terminal.

In some embodiments, the first configuration information includes at least one of the following: a minimum time interval between the paging early indication information and a first paging occasion of the N paging occasions, a value of N, and indexes of the N paging occasions.

Further, the processor 1420 is further configured to obtain second configuration information, and determine the first content based on the second configuration information and the paging early indication information. The second configuration information includes at least one of the following: the minimum time interval between the paging early indication information and a second paging occasion of the N paging occasions, a time-domain position of the paging early indication information, a frequency-domain position of the paging early indication information, the value of N, a candidate value of N, a value of the number W of paging groups associated with the paging occasion, and an indication relationship between the paging early indication information and the paging occasion.

Further, the minimum time interval satisfies at least one of the following: the minimum time interval is greater than or equal to a transmission period of K synchronization signal blocks, where K is a positive integer greater than or equal to 0; and the minimum time interval is related to at least one of channel quality of a serving cell, signal strength, coverage performance, terminal location, and terminal moving rate.

Further, the time-domain position of the paging early indication information satisfies at least one of the following: the time-domain position of the paging early indication information is prior to the N paging occasions and satisfies the minimum time interval; an end time point of the time-domain position of the paging early indication information is a time-domain start time point of a synchronization signal block; and an end time point of the time-domain position of the paging early indication information is a time-domain start time point of a synchronization signal block.

Further, the indication relationship includes any one of the following: different paging early indication information indicates a same paging occasion, or a same paging occasion is able to be indicated only by same paging early indication information; where, the first content indicated by the same paging early indication information is the same.

Further, the processor 1420 is further configured to: in a case that a plurality of pieces of paging early indication information with inconsistent first content are received, determine that the paging early indication information is invalid; where the plurality of pieces of paging early indication information with inconsistent first content indicate the same N paging occasions.

Further, the paging early indication information is carried by downlink control information DCI or a sequence.

Further, in a case that the paging early indication information is carried by the downlink control information DCI, an indication manner of the first content includes at least one of the following: a bitmap or a bit string.

Further, in a case that the paging early indication information is carried by downlink control information DCI, indication fields for indicating the first content in the paging early indication information are arranged in a preset arrangement order, where the preset arrangement order includes at least one of the following: being arranged based on paging occasions associated with the paging early indication information, being arranged based on content type of the first content, and being arranged in ascending or descending order of values of N.

It should be understood that in the embodiment of this application, the radio frequency unit 1402 may be configured to transmit and receive information, or transmit or receive a signal during a call process, specially, receiving downlink data from a base station or transmitting uplink data to the base station. The radio frequency unit 1402 includes but is not limited to an antenna, at least one amplifier, a transceiver, a coupler, a low noise amplifier, a duplexer, and the like.

The network module 1404 provides wireless broadband Internet access for users, for example, helping users send and receive e-mails, browse web pages, and access streaming media.

The audio output unit 1406 may convert audio data received by the radio frequency unit 1402 or the network module 1404 or stored in the memory 1418 into an audio signal and output the audio signal as a sound. In addition, the audio output unit 1406 may also provide audio output (for example, a call signal received sound or a message received sound) related to a specific function performed by the terminal 1400. The audio output unit 1406 includes a speaker, a buzzer, a telephone receiver, and the like.

The input unit 1408 is configured to receive audio or video signals. The input unit 1408 may include a graphics processing unit (GPU) 5082 and a microphone 5084. The graphics processing unit 5082 processes image data of a static image or a video obtained by an image capturing apparatus (for example, a camera) in a video capturing mode or an image capturing mode. The processed image frames can be displayed on the display unit 1412, or stored in the memory 1418 (or another storage medium), or transmitted via the radio frequency unit 1402 or the network module 1404. The microphone 5084 can receive sounds and process the sounds into audio data. The processed audio data can be converted in a telephone call mode into a format that can be transmitted by the radio frequency unit 1402 to a mobile communications base station, for outputting.

The terminal 1400 further includes at least one sensor 1410, a fingerprint sensor, a pressure sensor, an iris sensor, a molecular sensor, a gyroscope, a barometer, a hygrometer, a thermometer, an infrared sensor, an optical sensor, a motion sensor, and another sensor.

The display unit 1412 is configured to display information input by the user or information provided for the user. The display unit 1412 may include a display panel 5122. The display panel 5122 may be configured in a form of a liquid crystal display, an organic light-emitting diode, or the like.

The user input unit 1414 may be configured to receive input digit or character information and generate key signal input related to user settings and function control of the terminal. In some embodiments, the user input unit 1414 includes a touch panel 5142 and other input devices 5144. The touch panel 5142 is also referred to as a touch screen, which can collect a touch operation on or near the touch screen by a user. The touch panel 5142 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and transmits the touch point coordinates to the processor 1420, and can receive and execute a command transmitted by the processor 1420. The other input devices 5144 may include but are not limited to a physical keyboard, a functional button (such as a volume control button or a power on/off button), a trackball, a mouse, and a joystick. Details are not described herein.

Further, the touch panel 5142 may cover the display panel 5122. When detecting a touch operation on or near the touch panel 5142, the touch panel 5142 transmits the touch operation to the processor 1420 to determine a type of a touch event. Then the processor 1420 provides corresponding visual output on the display panel 5122 based on the type of the touch event. The touch panel 5142 and the display panel 5122 may serve as two independent components, or may also be integrated into one component.

The interface unit 1416 is an interface connecting an external apparatus to the terminal 1400. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, an earphone port, or the like. The interface unit 1416 may be configured to receive input (for example, data information and electric power) from the external apparatus, and transmit the received input to one or more elements in the terminal 1400; or may be configured to transmit data between the terminal 1400 and the external apparatus.

The memory 1418 may be configured to store software programs and various data. The memory 1418 may mainly include a program storage area and a data storage area. The program storage area may store an operating system, an application program required by at least one function (for example, an audio playing function and an image playing function), and the like. The data storage area may store data (for example, audio data and an address book) created according to use of the mobile terminal. In addition, the memory 1418 may include a high-speed random access memory, and may further include a non-volatile memory, for example, at least one magnetic disk storage device, a flash storage device, or another volatile solid-state storage device.

The processor 1420 performs various functions of the terminal 1400 and processes data by running or executing a software program and/or a module stored in the memory 1418 and invoking data stored in the memory 1418, so as to perform overall monitoring on the terminal 1400. The processor 1420 may include one or more processing units. The processor 1420 may integrate an application processor and a modem processor. The application processor mainly processes an operating system, a user interface, an application program, and the like, and the modem processor mainly processes functions related to wireless communications.

An embodiment of this application provides a readable storage medium, where a program or instructions are stored. In a case that the program or the instructions are executed by a processor, the steps of the paging indication method in any one of the foregoing embodiments are implemented.

In this embodiment, the readable storage medium can implement the processes of the paging indication method provided in the embodiments of this application, with the same technical effects achieved. To avoid repetition, details are not described herein again.

The processor is the processor of the communications device provided in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the paging indication method in the foregoing embodiments, and the same technical effects can be achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

The foregoing descriptions are merely preferred embodiments of this application, but are not intended to limit this application. Persons skilled in the art understand that this application may have various modifications and variations. Any modification, equivalent replacement, or improvement made without departing from the spirit and principle of this application shall fall within the protection scope of this application.

What is claimed is:

1. A paging indication method, comprising:

obtaining, by a terminal, paging early indication information carried by downlink control information (DCI), wherein the paging early indication information indicates first content; and determining, by the terminal, the first content based on the paging early indication information; wherein the first content comprises: a monitoring behavior in N paging occasions subsequent to the paging early indication information, and whether a first signal is available, the first signal being a tracking reference signal/ channel state information reference signal (TRS/CSI-RS); wherein:

N is a positive integer greater than or equal to 1, the DCI comprises N+1 information blocks, and the N+1 information blocks comprise N information blocks corresponding to monitoring behaviors in the N paging occasions respectively and one information block indicating whether the first signal is available, and indication fields for indicating the first content in the paging early indication information are arranged in a preset arrangement order; wherein the preset arrangement order comprises at least one of the following: being arranged based on paging occasions associated with the paging early indication information, being arranged based on content type of the first content, or being arranged in ascending or descending order of values of N.

2. The paging indication method according to claim 1, wherein:

each of the N paging occasions is associated with W paging terminal groups;

wherein W is a positive integer greater than or equal to 1, and the N information blocks in the DCI indicate, by means of a bitmap, monitoring behaviors for N×W paging terminal groups in the N paging occasions.

3. The paging indication method according to claim 2, wherein:

the monitoring behavior comprises at least one of the following: whether to monitor a paging physical downlink control channel (PDCCH) of a paging terminal group associated with the terminal, whether to monitor paging of the paging terminal group associated with the terminal, and whether to monitor a system information update of the paging terminal group associated with the terminal; and the paging terminal group associated with the terminal is at least one of paging terminal groups that are associated with at least one of the N paging occasions.

4. The paging indication method according to claim 1, further comprising:

obtaining, by the terminal, first configuration information related to the N paging occasions from the paging early indication information, wherein the paging early indication information further indicates the first configuration information, or obtaining, by the terminal, second configuration information, wherein the second configuration information is configured by a network side and/or specified by a protocol; and obtaining, by the terminal, the first configuration information from the second configuration information;

wherein the second configuration information comprises at least one of the following: a minimum time interval between the paging early indication information and a second paging occasion of the N paging occasions, a time-domain position of the paging early indication information, a frequency-domain position of the paging early indication information, the value of N, a candidate value of N, a value of the number W of paging terminal groups associated with the paging occasion, and an indication relationship between the paging early indication information and the paging occasion.

5. The paging indication method according to claim 4, wherein the first configuration information comprises at least one of the following: a minimum time interval between the paging early indication information and a first paging occasion of the N paging occasions, a value of N, and indexes of the N paging occasions.

6. The paging indication method according to claim 4, wherein the time-domain position of the paging early indication information satisfies at least one of the following:

the time-domain position of the paging early indication information is prior to the N paging occasions and satisfies the minimum time interval;

a start time point of the time-domain position of the paging early indication information is a time-domain end time point of a synchronization signal block; and an end time point of the time-domain position of the paging early indication information is a time-domain start time point of a synchronization signal block.

7. The paging indication method according to claim 4, wherein:

the indication relationship comprises any one of the following: each paging early indication information indicates at least one paging occasion and paging occasions indicated by different paging early indication information are at least partially same, or a same paging occasion is able to be indicated only by same paging early indication information; and the first content indicated by the same paging early indication information is the same.

8. The paging indication method according to claim 1, further comprising:

in a case that a plurality of pieces of paging early indication information with inconsistent first content are received, determining, by the terminal, that the paging early indication information is invalid;

wherein the plurality of pieces of paging early indication information with inconsistent first content indicate the same N paging occasions.

9. The paging indication method according to claim 1, wherein an indication manner of the first content comprises at least one of the following: a bitmap or a bit string.

10. A terminal, comprising:

at least one hardware processor, a memory, and a program or instructions stored in the memory and capable of running on the at least one hardware processor that, when executed, direct the at least one hardware processor to implement:

obtaining, by the terminal, paging early indication information carried by downlink control information (DCI), wherein the paging early indication information indicates first content; and determining, by the terminal, the first content based on the paging early indication information; wherein the first content comprises: a monitoring behavior in N paging occasions subsequent to the paging early indication information, and whether a first signal is available, the first signal being a tracking reference signal/channel state information reference signal (TRS/CSI-RS); wherein:

N is a positive integer greater than or equal to 1, the DCI comprises N+1 information blocks, and the N+1 information blocks comprise N information blocks corresponding to monitoring behaviors in the N paging occasions respectively and one information block indicating whether the first signal is available, and indication fields for indicating the first content in the paging early indication information are arranged in a preset arrangement order; wherein the preset arrangement order comprises at least one of the following: being arranged based on paging occasions associated with the paging early indication information, being arranged based on content type of the first content, or being arranged in ascending or descending order of values of N.

11. The terminal according to claim 10, wherein:

each of the N paging occasions is associated with W paging terminal groups; wherein W is a positive integer greater than or equal to 1, and the N information blocks in the DCI indicate, by means of a bitmap, monitoring behaviors for N×W paging terminal groups in the N paging occasions.

12. The terminal according to claim 11, wherein:

the monitoring behavior comprises at least one of the following: whether to monitor a paging PDCCH of a paging terminal group associated with the terminal, whether to monitor paging of the paging terminal group associated with the terminal, and whether to monitor a system information update of the paging terminal group associated with the terminal; and the paging terminal group associated with the terminal is at least one of paging terminal groups that are associated with at least one of the N paging occasions.

13. The terminal according to claim 10, wherein the at least one hardware processor is further directed to implement:

obtaining, by the terminal, first configuration information related to the N paging occasions from the paging early indication information, wherein the paging early indication information further indicates the first configuration information, or obtaining, by the terminal, second configuration information, wherein the second configuration information is configured by a network side and/or specified by a protocol; and obtaining, by the terminal, the first configuration information from the second configuration information; wherein the second configuration information comprises at least one of the following: a minimum time interval between the paging early indication information and a second paging occasion of the N paging occasions, a time-domain position of the paging early indication information, a frequency-domain position of the paging early indication information, the value of N, a candidate value of N, a value of the number W of paging terminal groups associated with the paging occasion, and an indication relationship between the paging early indication information and the paging occasion.

14. The terminal according to claim 10, wherein an indication manner of the first content comprises at least one of the following: a bitmap or a bit string.

15. A non-transitory computer-readable storage medium storing a program or instructions executable by at least one hardware processor that, when executed, direct the at least one hardware processor to implement:

obtaining, by a terminal, paging early indication information carried by downlink control information (DCI), wherein the paging early indication information indicates first content; and determining, by the terminal, the first content based on the paging early indication information; wherein the first content comprises: a monitoring behavior in N paging occasions subsequent to the paging early indication information, and whether a first signal is available, the first signal being a tracking reference signal/channel state information reference signal TRS/CSI-RS); wherein:

N is a positive integer greater than or equal to 1, the DCI comprises N+1 information blocks, and the N+1 information blocks comprise N information blocks corresponding to monitoring behaviors in the N paging occasions respectively and one information block indicating whether the first signal is available, and indication fields for indicating the first content in the paging early indication information are arranged in a preset arrangement order; wherein the preset arrangement order comprises at least one of the following: being arranged based on paging occasions associated with the paging early indication information, being arranged based on content type of the first content, or being arranged in ascending or descending order of values of N.

16. The paging indication method according to claim 5, wherein:

the minimum time interval in the first configuration information is greater than or equal to a transmission period of K synchronization signal blocks, wherein K is a positive integer greater than 0; or the minimum time interval in the first configuration information is related to at least one of channel quality of a serving cell, signal strength, coverage performance, terminal location, and terminal moving rate.

* * * * *